United States Patent
Houri et al.

(10) Patent No.: US 10,824,878 B2
(45) Date of Patent: Nov. 3, 2020

(54) METHOD AND ARRANGEMENT FOR RECEIVING DATA ABOUT SITE TRAFFIC DERIVED FROM IMAGING PROCESSING

(71) Applicant: Accuware, Inc., Miami Beach, FL (US)

(72) Inventors: Cyril Houri, Miami Beach, FL (US); Gianni Giorgetti, San Diego, CA (US)

(73) Assignee: Accuware, Inc., Miami Beach, FL (US)

( * ) Notice: Subject to any disclaimer, the term of this patent is extended or adjusted under 35 U.S.C. 154(b) by 155 days.

(21) Appl. No.: 16/038,132

(22) Filed: Jul. 17, 2018

(65) Prior Publication Data
US 2018/0349710 A1    Dec. 6, 2018

Related U.S. Application Data

(63) Continuation-in-part of application No. 15/064,568, filed on Mar. 8, 2016, now Pat. No. 10,026,003.

(51) Int. Cl.
*G06K 9/00* (2006.01)
*G06T 7/90* (2017.01)

(52) U.S. Cl.
CPC ..... *G06K 9/00778* (2013.01); *G06K 9/00342* (2013.01); *G06K 9/00664* (2013.01); *G06T 7/90* (2017.01); *G06K 9/00771* (2013.01); *G06T 2207/30232* (2013.01)

(58) Field of Classification Search
CPC ........... G06K 9/00778; G06K 9/00664; G06K 9/00342; G06K 9/00771; G06T 7/90; G06T 2207/30232
See application file for complete search history.

(56) References Cited

U.S. PATENT DOCUMENTS

| | | | |
|---|---|---|---|
| 6,363,160 B1 | 3/2002 | Bradski et al. |
| 7,092,566 B2 | 8/2006 | Krumm |
| 7,177,737 B2 | 2/2007 | Karlsson |
| 7,397,424 B2 | 7/2008 | Houri |
| 7,696,923 B2 | 4/2010 | Houri |

(Continued)

OTHER PUBLICATIONS

Jansari et al. "Real-Time Object Tracking Using Color-Based Probability Matching." IEEE International Conference on Signal Processing, Computing and Control (ISPCC), Sep. 26, 2013, 6 pages (Year: 2013).*

(Continued)

*Primary Examiner* — Jon Chang
(74) *Attorney, Agent, or Firm* — Brian Roffe

(57) ABSTRACT

Monitoring technique includes identifying objects in images and associating color characteristics with each identified object. When the color characteristics of an object in one image are above a color resemblance threshold to the color characteristics of an object in another image, the object in both images is considered the same. Otherwise, the respective object in both images are considered to be different. Data about time that each image including an identified object was obtained and location of each object when each image including an identified object was obtained is derived. An information conveyance system is activated to convey the time and location-related data about identified objects relative to defined areas of the site or movement of the identified objects or people into, between or out of the defined areas of the site or a communication resulting from such data satisfying one or more conditions.

20 Claims, 9 Drawing Sheets

(56) References Cited

U.S. PATENT DOCUMENTS

| | | |
|---|---|---|
| 8,089,548 B2 | 1/2012 | Ogura et al. |
| 8,195,126 B1 | 6/2012 | Houri |
| 8,224,078 B2 | 7/2012 | Boncyk |
| 8,320,616 B2 | 11/2012 | Kaiser |
| 8,325,979 B2 | 12/2012 | Taborowski |
| 8,478,040 B2 | 7/2013 | Brogren et al. |
| 8,498,477 B2 | 7/2013 | Getsch |
| 8,565,788 B2 | 10/2013 | Houri |
| 8,670,381 B1 | 3/2014 | Houri |
| 8,855,366 B2 | 10/2014 | Wagner et al. |
| 8,958,980 B2 | 2/2015 | Miksa |
| 8,970,690 B2 | 3/2015 | Meier |
| 9,031,283 B2 | 5/2015 | Arth |
| 9,036,867 B2 | 5/2015 | Chiussi |
| 9,098,905 B2 | 8/2015 | Rivlin |
| 9,129,397 B2 | 9/2015 | Choi et al. |
| 9,153,073 B2 | 10/2015 | Langlotz |
| 9,171,229 B2 | 11/2015 | Hsieh et al. |
| 9,226,224 B1 | 12/2015 | Houri et al. |
| 9,239,849 B2 | 1/2016 | Forutanpour |
| 9,275,299 B2 | 3/2016 | Den Hollander et al. |
| 9,275,447 B2 | 3/2016 | Jiang |
| 10,311,577 B1 | 6/2019 | Goodsitt et al. |
| 2006/0098865 A1 | 5/2006 | Yang et al. |
| 2008/0274752 A1 | 11/2008 | Houri |
| 2010/0296697 A1 | 11/2010 | Ikenoue |
| 2013/0223673 A1 | 8/2013 | Davies et al. |
| 2013/0266181 A1* | 10/2013 | Brewer ............. G06K 9/00302 382/103 |
| 2014/0022394 A1 | 1/2014 | Bae et al. |
| 2014/0223319 A1 | 8/2014 | Uchida |
| 2014/0342756 A1 | 11/2014 | Houri |
| 2015/0071497 A1 | 3/2015 | Kuusisto |
| 2015/0287246 A1 | 10/2015 | Huston |
| 2016/0110613 A1 | 4/2016 | Ghanem et al. |
| 2016/0148054 A1* | 5/2016 | Han ................... G06K 9/00355 382/103 |
| 2016/0261808 A1* | 9/2016 | Tojo ................... G06K 9/00771 |
| 2016/0379060 A1 | 12/2016 | Li |
| 2017/0148418 A1 | 5/2017 | Zhang |
| 2017/0351906 A1* | 12/2017 | Oguchi ............... G08B 13/196 |
| 2018/0047181 A1* | 2/2018 | Miyazaki ................ G06T 7/11 |

OTHER PUBLICATIONS

Wen et al. "People Tracking and Counting for Applications in Video Surveillance System." International Conference on Audio, Language and Image Processing, Jul. 7, 2008, pp. 1677-1682 (Year: 2008).*

* cited by examiner

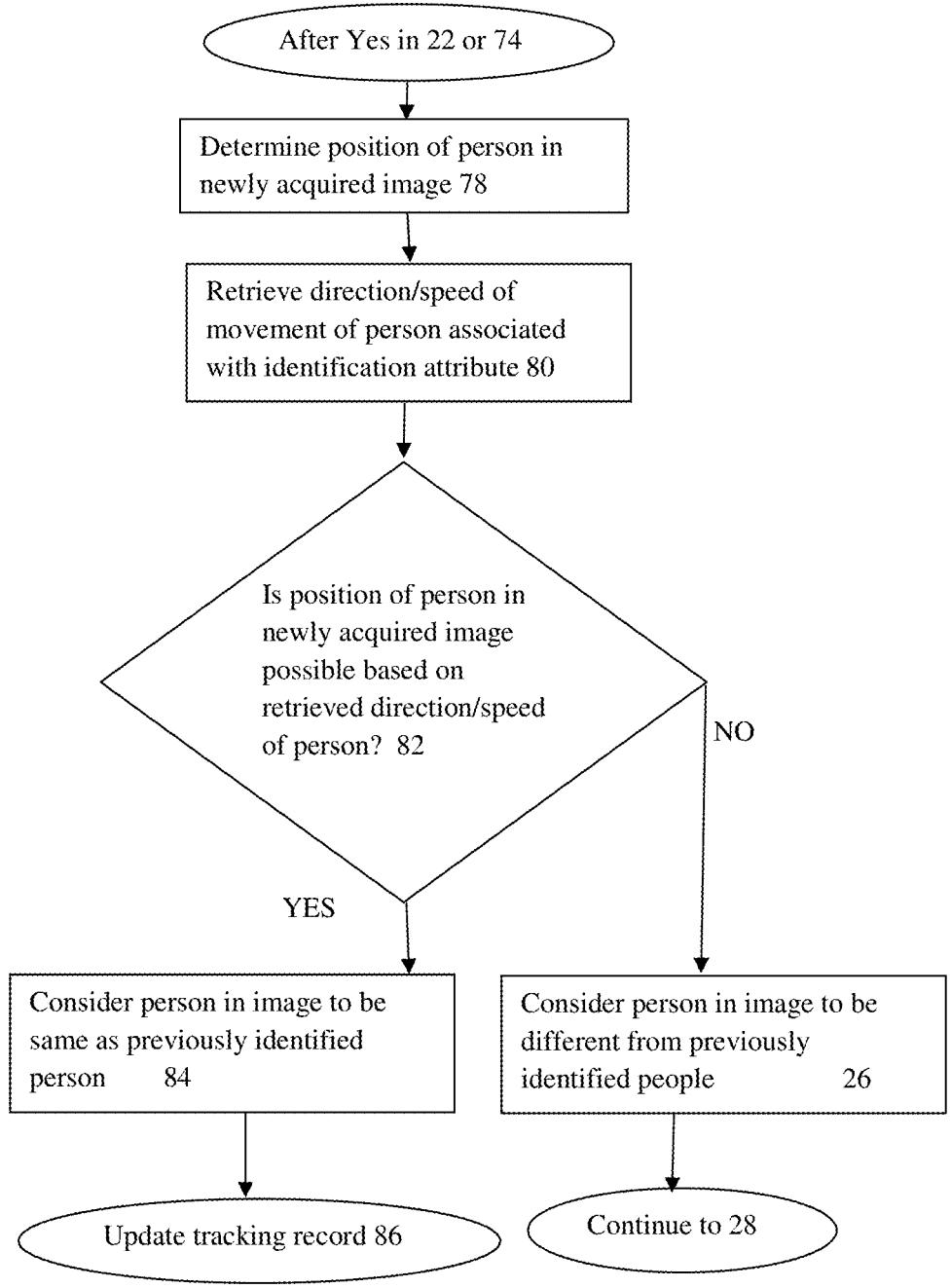

US 10,824,878 B2

METHOD AND ARRANGEMENT FOR RECEIVING DATA ABOUT SITE TRAFFIC DERIVED FROM IMAGING PROCESSING

FIELD OF THE INVENTION

The present invention relates to various techniques to transform images into data about specific objects or people identified in those images. More specifically, the present invention relates to methods and arrangements to analyze images based initially on color characteristics of objects or people in the images and location of the objects or people to locate, track and monitor the objects or people. Additional image analysis improves the tracking by increasing the probability that objects or people in different images are the same.

BACKGROUND OF THE INVENTION

Object locating and tracking algorithms are known, and the features of these algorithms are varied. For example, U.S. Pat. No. 9,171,229 (Hsieh et al.) describes a visual object tracking method entailing setting an object window having a target in a video image, defining a search window greater than the object window, analyzing an image pixel of the object window to generate a color histogram for defining a color filter which includes a dominant color characteristic of the target, and using the color filter to generate an object template and a dominant color map in the object window and the search window respectively. The object template includes a shape characteristic of the target, while the dominant color map includes at least one candidate block. Similarity between the object template and the candidate block is compared to obtain a probability distribution map, and the probability distribution map is used to compute the mass center of the target. The method generates the probability map by the color and shape characteristics to compute the mass center.

U.S. Pat. No. 9,129,397 (Choi et al.) describes a human tracking method using a color histogram is that can allegedly more adaptively perform human tracking using different target color histograms according to the human poses, instead of applying only one target color histogram to the tracking process of one person, such that the accuracy of human tracking can be increased. The human tracking method entails performing color space conversion of input video data, calculating a state equation of a particle based on the color-space conversion data, calculating the state equation, and calculating human pose-adaptive observation likelihood, resampling the particle using the observation likelihood, and then estimating a state value of the human and updating a target color histogram.

U.S. Pat. No. 8,478,040 (Brogren et al.) describes an identification apparatus in a video surveillance system for identifying properties of an object captured in a video sequence by a video surveillance camera. The identification apparatus includes an object identification unit for identifying a specific object in a video sequence, a color histogram generator for generating a color histogram in at least two dimensions of a color space based on color and intensity information of the specific object identified in the video sequence, the color and intensity information originating from a plurality of images of the video sequence, and an object properties identificator for identifying properties of the object based on the generated color histogram. The identified properties can then allegedly be used in a tracking device of the video surveillance system for tracking an object between different video sequences, which may be captured by two different video surveillance cameras. A corresponding method for identifying properties of an object captured in a video sequence and a method for tracking the object in a video surveillance system are also described.

SUMMARY OF THE INVENTION

A method for monitoring objects or people at a site and using information obtained from the monitoring in accordance with the invention includes identifying objects or people in images using a processor and associating color characteristics with each identified object or person. When the color characteristics of an object or person in one image is above a threshold of color resemblance to the color characteristics of an object or person in another image, typically a previously obtained and processed image, an additional determination is made whether based on information about when the current image and the previously analyzed image were obtained, whether it is possible that the same object or person can be present in both the current image and the previously analyzed image. This determination may be made considering location and movement information about the presumed same object.

When it is determined that it is possible that the same object or person can be present in both the current image and the previously analyzed image, i.e., by assigning a maximum speed of movement to objects and people and considering the time difference between when the images were obtained and the different object locations, the tracking record for the identification attribute assigned to the color characteristic is updated with the time and location-related data about the object or person determined to be present in the current image such that the tracking record includes the location-related data at different times to enable a path of the object or person to be generated.

On the other hand, when it is determined that the color characteristics of an object or person in one image is not above a threshold of color resemblance to the color characteristics of an object or person in another image or it is determined that it is not possible that the same object or person can be present in both the current image and the previously analyzed image, e.g., the object or person could not have moved 10 meters in 0.1 seconds, then the person or object is considered a new object and a unique identification attribute is assigned to the associated color characteristic a tracking record for the identification attribute is generated including the time and location-related data about the object or person determined to be present in the current image.

Finally, an information conveyance system is activated to convey the generated tracking records about objects or people. For example, the information conveyance system may be activated to convey the time and location-related data about identified objects or people relative to defined areas of the site or movement of the identified objects or people into, between or out of the defined areas of the site and/or to convey a communication resulting from the time and location-related data satisfying one or more conditions. As used herein, an information conveyance system will generally mean any system having at least partly physical form that conveys information to a person (e.g., visually such as a display, audibly such as a speaker) or to a machine (e.g., as a transmission or command signal to an actuator).

With the foregoing steps, an embodiment of the method may be considered to include an identification stage, a characterization stage to link the same identified objects or people and which is performed relative to a color resemblance threshold and location and movement information, a data derivation stage, and a data usage stage involving altering of a physical component based on the data derivation stage. Images are thus transformed into physical action by the component of a nature desired by the entity monitoring, operating, owning or simply interested in activity at the site from which the images are obtained. Such physical action may be, but is not limited to, generating and displaying a graphical representation of the data derived from the images on a display, generating warnings of an audio and/or visual type about activity determined from the data derived from the images using an audio warning and/or visual warning generating system, and directing communications via a communications system to personnel to respond or react to activity at the site.

When the information conveyance system is a display, the time and location-related data may be accessed using a user interface to enable visualization on the display of the time and location-related data. Additionally or alternatively, a map may be generated containing at least one of the defined areas and an indication of the presence of the objects or people in or proximate to each of the at least one defined area and/or an indication of the movement of the objects relative to the at least one defined area, and displayed on the display.

Enhancements to the method include generating a tracking record of specific objects or people by combining together the time and location-related data of each specific objects or person over a period of time. The tracking record includes the location-related data for each object or person at a plurality of different times to enable a path of the object or person to be generated. The tracking record may be conveyed by the information conveyance system, i.e., presented in a graphical form as a line on a map of the site representing the path taken by the person or object through the site.

The information conveyance system may be activated in real-time, i.e., at the same time as the movement of objects and people at the site is occurring, to convey in real time, the location-related data about one or more identified objects or people relative to defined areas of the site or movement of the identified objects or people into, between or out of the defined areas of the site. When the information conveyance system comprises a warning generating system, the warning generating system is activated to convey a warning communication resulting from the time and location-related data satisfying one or more conditions, e.g., the site being overcrowded.

There are several techniques to perform the color resemblance threshold assessment. Generally, through design and development that will be readily determinable by those skilled in the art to which this invention pertains in view of the disclosure herein, thresholds are determined to allow for a high degree of confidence that two objects or people with very similar color characteristics are likely to be the same object or person (objects or people with the same color characteristics are obviously considered to be the same object or person). One technique is to associate color characteristics with each object or person by generating a histogram of colors of visible parts of each object or person to be associated with each object or person. A degree of similarity between histograms above a threshold, e.g., 98% similarity, will be considered to be the same object or person.

Another technique to associate color characteristics with each object or person is to generate at least one geometric form representative of a dominant visible color of each object or person to be associated with each object or person.

A degree of similarity between the forms, considering shape and size, above a threshold, e.g., 98% similarity, will be considered to be the same object or person. Yet another technique to associate color characteristics with each object or person is to generate a plurality of two-dimensional geometric forms each representative of a dominant visible color of a discrete portion of each object or person to associated with each object or person. A degree of similarity between the geometric forms, considering their shape and size, above a threshold, e.g., 95% similarity, will be considered to be the same object or person.

To address the issue of objects or people remaining at the same site for a finite amount of time, and allow for use of the same color characteristics at different times, the processor performing the color characteristic resemblance threshold determination may be configured to consider the object or person in two or more images to be the same when the color characteristics of an object or person in one image is above a threshold of color resemblance to the color characteristics of an object or person in another image only when the another image is taken within a time threshold of the another image. This time threshold may be a function of the type of site, e.g., one hour for a store, three hours for a movie theater, four hours for a museum, one day for a sports stadium, etc.

For this embodiment in particular, but available for other embodiments, a tracking record of specific objects or people may be generated by combining together the time and location-related data of each specific objects or person over a period of time. The tracking record would include the location-related data for each object or person at a plurality of different times to enable a path of the object or person to generated, and could be conveyed by the information conveyance system. A determination may be made, using the processor, when the specific object or person is no longer present at the site based on the tracking record, and then the processor is configured to refrain from using the color characteristics of the specific object or person after the specific object or person is no longer present at the site as the basis for a determination relative to the threshold of color resemblance.

The images may be obtained from imaging devices having known positions relative to the site being monitored, e.g., on fixed structures adjacent the defined areas.

In some embodiments, even when the color characteristics of an object or person in one image is above the threshold of color resemblance to the color characteristics of an object or person in another image, the object or person in both images is not considered to be the same for further processing purposes unless it is physically possible for the object or person to be the same. This possibility is analyzed relative to location and/or movement-related information about the object or person.

In such embodiments, inclusion in the tracking record for the identification attribute assigned to the color characteristic of the object or person in the previously analyzed image, of the time and location-related data about the object or person in the newly acquired image is thus conditional. The condition is determined to be satisfied by determining the location of the object or person in the newly acquired image and determining whether it is possible for this object or person to be the same as the object or person in the previously analyzed image based on differences in time and location of the object or person in both images, and movement-related information about the object or person in the previously analyzed image. When it is determined that it is possible for the object or person in the newly acquired image to be the same as the object or person in the previously analyzed image, the tracking record for the identification attribute assigned to the color characteristic and estimated height of the object or person is updated. However, when it is determined that it is not possible for the object or person in the newly acquired image to be the same as the object or person in the previously analyzed image (based on mathematical calculations involving time, distance, speed), then a unique identification attribute is assigned to the associated color characteristic, and a tracking record is then generated for the identification attribute including the time and location-related data about the object or person in the newly acquired image (it is considered a new object or person).

In one embodiment, it is possible to store identification attributes with the associated color characteristics and the location and movement-related information in a database for later retrieval when determining whether it is possible for the object or person in the newly acquired

BRIEF DESCRIPTION OF THE DRAWINGS

The invention, together with further pattern of pixels and advantages thereof, may best be understood by reference to the following description taken in conjunction with the accompanying drawings, wherein like reference numerals identify like elements, and wherein:

FIG. 11 is a flowchart that provides for movement-related information analysis when creating tracking records in methods in accordance with the invention.

DETAILED DESCRIPTION OF THE INVENTION

Figure 1:
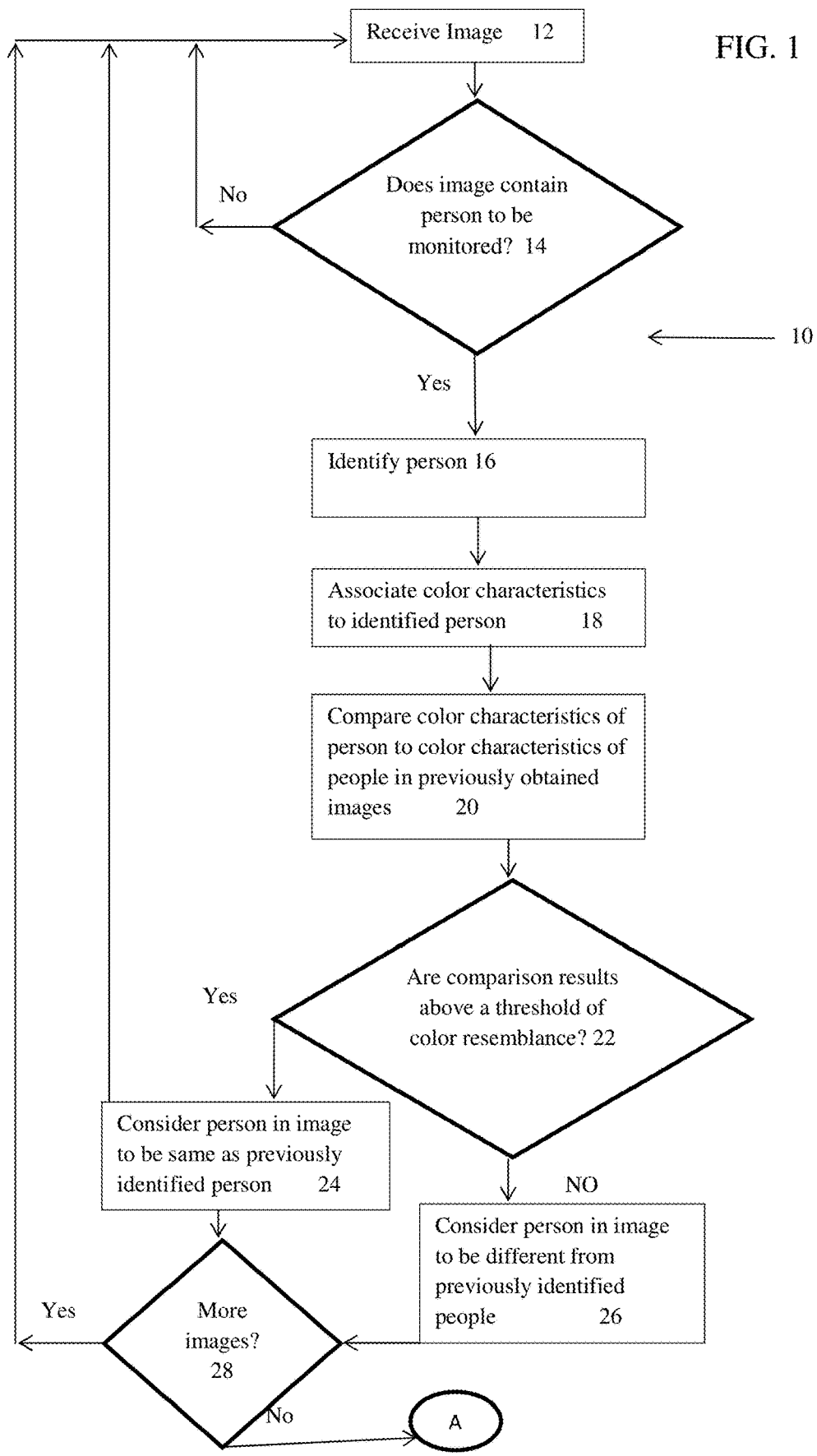
FIG. 1 is a flowchart of a method for monitoring people at a site in accordance with the invention.

Referring to the accompanying drawings wherein like reference numbers refer to the same or similar elements, the present invention will be initially described with respect to a monitoring technique and specifically, a technique to analyze the behavior of people visiting a physical site by capturing their location throughout the site, in real time and over a period of time or over time.

As used herein, real time will generally mean that the current status of the location and prior movement of people throughout the site can be quantified and the quantified output directed to one or more remote terminals where it can be displayed or otherwise output to an interested person using an information conveyance system. Monitoring over time will generally mean that the status of the location and movement of people throughout the site for a defined period of time, e.g., the opening hours of store, the duration of an event and one or more days, can be quantified and the quantified output directed to a remote terminal where it can be displayed, e.g., in the form of a graphical or tabular representation (chart or table), or otherwise output to an interested person. The interested person may be, for example, a monitor of the site, an operator of the site, an owner of the site, safety personnel concerned with security at the site, and law enforcement personnel concerned with potential criminal activity at the site.

In both monitoring situations, the quantified data may be the amount of time people wait for services provided at the site ("wait time"), the amount of time people wait in line for service at the site ("queue time"), the amount of time people linger in a specific location at the site ("dwell time"), the path that people take through the site, and whether the people have visited the site before. The real time and over time displays may be provided or available to the remote terminal simultaneously.

As for specific examples, in a retail setting, a department store can use the monitoring technique in accordance with the invention to analyze in-store behavior of their customers, assess the effectiveness of marketing programs and promotions, and learn about their staff's utilization. The first analysis may be derived from monitoring of the location of the customers in the store relative to items for sale at the store, the second analysis may be derived from the dwell time of people proximate marketed or promoted sales items at the store, and the third analysis may be derived from the wait time and queue time relative to check-out, return and service request lines at the store. It is also possible to analyze, from the tracked movement of the people, their preferred paths and which areas have the highest density over time.

Architectural firms can use the monitoring technique in accordance with the invention to set up monitoring systems to gauge utilization of living or work spaces they design or look forward to improve. An over-time display of the dwell time of people in sections of the living or work spaces can provide data about utilization thereof.

Urban planners can use the monitoring technique in accordance with the invention to understand pedestrian's circulation patterns, utilization of public spaces, and demand on city services at various times of the day, week or month.

Referring first to FIG. 1, a method for monitoring people at a site is explained in flow chart form, and is designated generally as 10. The same monitoring technique may be used to monitor objects, but hereinafter, the method and arrangement applying the method will generally be described with respect to people monitoring. As used herein, objects will often be used as an alternative to people. Nevertheless, objects may also be considered to encompass people. The first step 12 is to receive an image and then, determine whether the image contains a person to be monitored, step 14.

More specifically, the processor receiving the image may be configured to access and execute a computer program on computer-readable media to initially analyze each received image to determine whether it includes at least one person sought to be monitored. This initial stage may be implemented by a person recognition or identification technique applied to images, many of which are known to those skilled in the art to which this invention pertains. This stage may be considered a threshold stage because if the image does not contain a person sought to be monitored, there is no need for the processor to perform the following additional steps. Rather, the processor may discard the image and await reception of another image for processing. Thus, if people at the site are being monitored and execution of a person presence determination stage of a computer program does not output the presence of a person in the image, the processor waits to receive another image until an image having a person is received.

It is also possible to perform the threshold determination of whether an image includes a person sought to be monitored apart from the processor so that the processor receives only images having people. This separate stage may be performed by a processor associated with or integrated into the component obtaining the images. Thus, a camera assembly in accordance with the invention can therefore simply obtain images for forwarding to a processor for determining the presence of a person therein and when present, for analysis of the location of the person. Alternatively, the camera assembly may be configured to perform the person presence determination and when present in an image, forward the image to the processor. In the latter case, not all images obtained by the camera assembly are directed to the processor but only those determined to include a person.

The camera assembly is usually a video camera that obtains continuous color images, i.e., a series of continuous image frames, whereby each color image can be individually analyzed. The scan rate may be one second or otherwise determined by the user. The invention can be applied in a retrofit arrangement using an existing video surveillance system, in which case, the existing video surveillance system is coupled to a processing unit configured to perform the image processing steps of the method. Color cameras of medium to high resolution are preferred.

If the image has been determined to include a person to be monitored, the method proceeds to step 16, to identify the person or people in the image using a processor and then in step 18, to associate color characteristics with each identified person. As used herein, to associate a color characteristic with each identified person generally means to generate a color characteristic that relates to, is derived from, is based on, and/or is a function of, the identified person and specifically from imaging in color of the identified person. Thus, the color image of the person is converted into an associated color characteristic. Different people wearing different color clothes will thus have different associated color characteristics, as will different shapes and sizes of people, even if wearing the same color clothes.

An important aspect of the invention is the conversion or transformation of an identified person in an image into one or more associated color characteristics using the same technique so that whenever an image containing the same person is processed by the processor applying the person-color characteristic conversion technique, the same color characteristic(s) will be associated with the person. As such, it becomes possible to analyze time and location-related data about each image and monitor the location and track the movement of a person in real time and over time by following color characteristics.

It is highly desirable that the color characteristics be as specific as possible so that two different people are not erroneously considered to be the same person. Ideally, a unique color characteristic would be generated for each identified person. In an effort to achieve this ideal situation, a color resemblance threshold is introduced whereby two color characteristics that are determined to have a similarity above a threshold are considered to be from the same person. Generating a color characteristic for each person may involve generating a histogram of colors of visible parts of each person. The manner in which to generate a histogram is known to those skilled in the art, and any known histogram generating technique that generates a histogram from an object in an image may be used in the invention. Generally in such techniques, the boundary of the person and their clothes and other worn objects (e.g., hat, backpack, glasses), or other object, is delineated and then the area inside the boundary analyzed to determine the colors present and the histogram created from the colors that are present.

Figure 7:
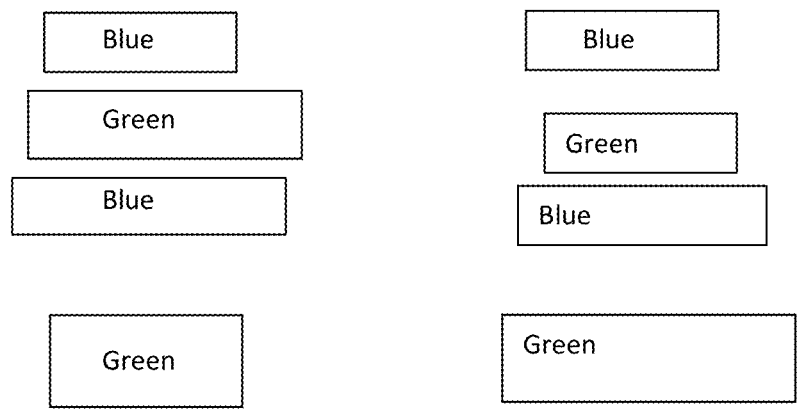
FIG. 7 is a schematic showing different color characteristics below a threshold of color resemblance indicating two different people)

As an alternative, the person may be rendered into a combination of geometric forms, each form representative of a dominant visible color of a portion of each person or possibly the only color in that portion of the person. Each form has a size and preferably two-dimensional shape derived from analysis of the person. The manner in which a person, or other object, can be rendered into a combination of variably sized and/or shaped geometric forms may be by analyzing the image to determine common colored areas and then delineating these common colored areas thereby forming geometric shapes of various sizes. It is also possible to analyze the image to determine areas having a dominant color. For example, a person might be reduced to the combinations of geometric forms as shown in FIG. 7, with each form indicating the only or dominant color of that part of the object.

Note that the colors are the same and in the same order, yet since the size and shape of the geometric forms, rectangles in this case, are different, the two people will have different color characteristics, i.e., the similarity of the same color is not sufficient to render the similarity above the color resemblance threshold.

In order to enable monitoring and tracking of people based on color characteristics, the next step 20 in the method performed by the processor is to compare the color characteristics of a person in the image being currently processed to the color characteristics of people in previously processed images. From this comparison, a determination is made whether the color characteristics of a person in the currently processed image is above the threshold of color resemblance to the color characteristics of a person in another image, step 22. If so, the person in both images is considered to be the same, step 24.

When the color characteristics of an identified person in one image is at or below the threshold of color resemblance to the color characteristics of any people in images previously obtained and being used for the comparison, then the processor is configured to consider the person in the image to be different than any previously identified person, step 26.

The threshold of color resemblance is therefore a measure of confidence that the color characteristic of one person identified in one image is so similar to the color characteristic of a person identified in a different image that it can be assumed that the same person is in both images. For example, if the color characteristic of one person in one image provides a histogram in which yellow is the dominant color, and if the color characteristic of a person in another image provides a histogram in which green is the dominant color, the color characteristic comparison relative to the threshold of color resemblance will be below the threshold and thus the people are considered not to be the same. On the other hand, if the color characteristic of one person in one image provides a histogram in which blue is the dominant color, and if the color characteristic of a person in another image provides a histogram in which blue in the dominant color, the color characteristic comparison relative to the threshold of color resemblance is above the threshold and thus the people are considered to be the same.

It should be understood that the threshold of color resemblance can be adjusted so that, for example, a light blue to blue color comparison may be considered to be above the threshold. The threshold may also be assigned a percentage value, e.g., 95% or 98%, indicative of the degree of similarity of, for example, the histograms of identified people in two different images. The percentage value may be adjustable based on user preference.

For example, when using the two-dimensional geometric forms, the color resemblance threshold may be a percentage of color similarity and/or a percentage of size similarity. Thus, if the same order and shape of colors are present in the geometric forms of two identified people but the size of the geometric forms differs by only 1%, then the color characteristic comparison relative to the threshold of color resemblance may be considered to be above the threshold and thus the people are considered to be the same. In FIG. 7, the order and shape (rectangular) of the geometric forms is the same, but the size of the rectangles in the $2^{nd}$ color characteristic is considerably different from the size of the rectangles in the $1^{st}$ characteristic. These size differences cause the processor to consider the people from which the color characteristics are derived to be from different people, i.e., the comparison of the $2^{nd}$ color characteristic to the $1^{st}$ color characteristic is below the threshold of color resemblance.

Figure 8:
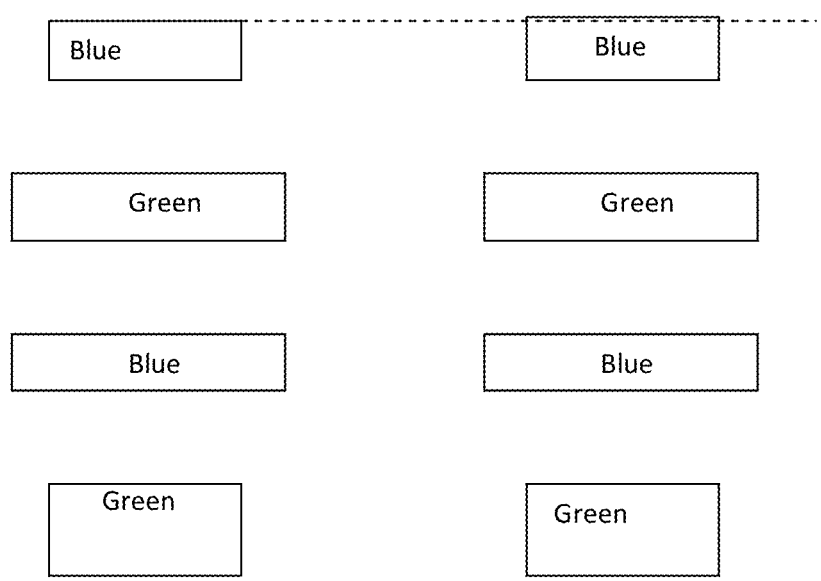
FIG. 8 is a schematic showing different color characteristics above a threshold of color resemblance indicating the same person)

By contrast, in FIG. 8, the upper rectangle in the $2^{nd}$ color characteristic is slightly larger than upper rectangle in the $1^{st}$ characteristic (see the area above the dotted line), yet the processor will considered them to be derived from the same person because the difference in the size is very small and the remaining similarities in the colors of the geometric forms, the order of the geometric forms and the size of the geometric forms, renders the comparison of the $2^{nd}$ color characteristic to the $1^{st}$ color characteristic above the threshold of color resemblance. Thus, in one example of the application of the use of the threshold of color resemblance, any difference in size of 1% or greater will result in the people not being considered the same, even though the geometric forms of their color characteristics have the same shape and color and order of forms.

Figure 2:
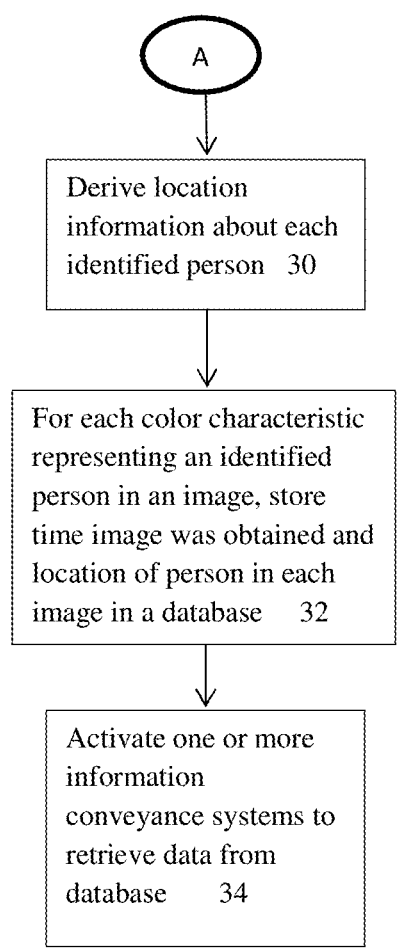
FIG. 2 is a continuation of the flowchart of the method for monitoring people at a site in accordance with the invention shown in FIG. 1.

Referring now to FIG. 2, which is a continuation of FIG. 1, after the comparison of the color characteristic of an image to the color characteristic of previously obtained images, a determination is made whether there are more images to be processed, step 28. If so, the method returns to step 12.

If not, it is then possible to use the information obtained when analyzing the color characteristics of each identified person. Several different uses of the information are envisioned, including those mentioned above. Most uses involve location data about each identified person or a group of identified people, and to this end, the processor is configured to derive location information in step 30. Exemplifying techniques to derive location data are explained below. These techniques are not required in the invention and any technique to provide location data about a single identified person or a group of identified people in the images may be used in the invention.

Once the location data is derived, the processor creates a database for each color characteristic representing an identified person in an image, and stores the time the image was obtained and location of person in each image in the database, step 32. The database may be embodied on computer-readable media of one or more memory components. Preferably, the processor may first assign an identification attribute to the color characteristic. A record for identification attributes, each representing a person with unique color characteristics, may be as follows:

| Identification attributes | Time 1 (time at which image 1 was taken) | Time 2 (time at which image 2 was taken) | Time 3 (time at which image 3 was taken) | Time 4 (time at which image 4 was taken) | Time 5 (time at which image 5 was taken) |
| --- | --- | --- | --- | --- | --- |
| 0020 | Location A | Location B | Location D | Location A | Location A |
| 0021 | Location C | Location B | Location C | Location C | Location A |
| 0022 | Location C | Location B | Location B | Location B | |
| 0023 | | Location B | Location D | Location A | Location A |
| 0024 | | Location D | | | |
| 0025 | | | Location D | Location A | Location A |
| 0026 | | Location D | Location A | Location A | |

By continually retrieving and analyzing images, a database of identification attributes (representing identified people) with the location of each person at different times is thus created and stored on computer-readable media in a manner known to those skilled in the art to which this invention pertains. The database may have many different forms including hardware and software combinations, limited only by the knowledge of those skilled in the art. The database may be stored in one or more physical locations, located in the cloud, located on a portable terminal used by the person interested in monitoring and tracking people at the locations, or combinations of the foregoing.

The foregoing image analysis process continues over a period of time. When desired, it is possible to generate output from the database, for example, for visualization by an interested person on a display of their computer, laptop, notebook, smartphone or other data display terminal. More generally, it is possible to activate an information conveyance system to retrieve data from the database to convey the time and location-related data about identified people, step 34. Typically, the time and location-related data is output relative to defined locations, e.g., relative to defined areas of the site or movement of the identified people into, between or out of the defined areas of the site.

To this end, a processor on a remote terminal authorized to access the database and upon activation by the handler accesses and executes a program on computer-readable media (partly or entirely on the terminal) that accesses data in the database about the location of the people. For example, if a count of people in one location over the course of time is sought, a graph can be generated with time on the X-axis and a count of the people in the location on the Y-axis (e.g., tallying the number of identification attributes at location A as a function of time). If the amount of time people remain in the location is sought, the program would be configured to determine the time that the presence of each identification attribute in the location does not change and consider that dwell time, and then chart or graph average or median dwell time for the location. Numerous calculations about the presence and location of people in the locations are derivable from the data in the database. These calculations can all be displayed on a display of the remote terminal at the request of the user.

A user interface is typically used to cause the processor to access the stored information in the database, and enable visualization on a display of the data about the presence of the people in or proximate to the locations or movement of the people into, between or out of the locations. The user interface is associated with the remote terminal, e.g., a smartphone.

Figure 9:
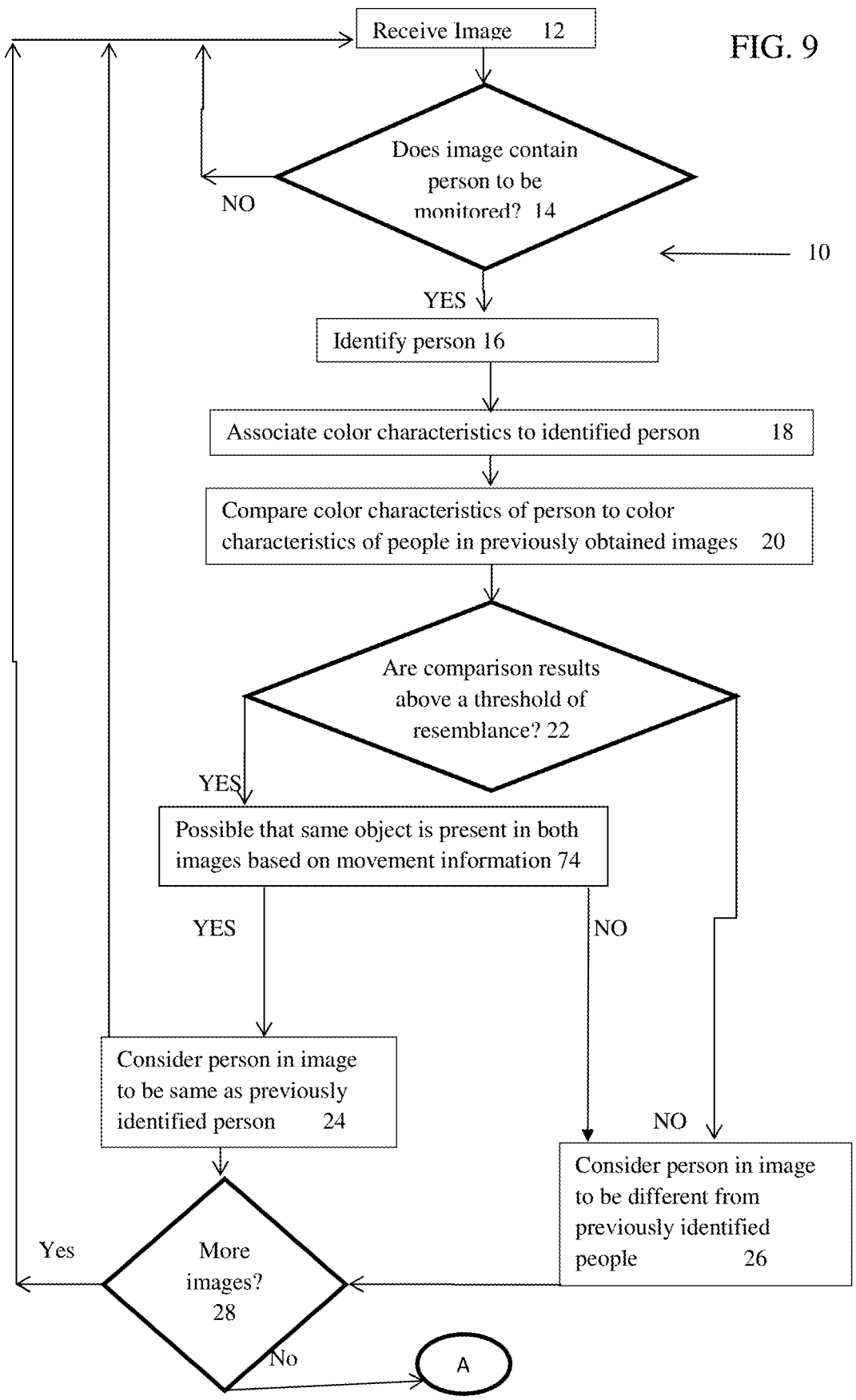
FIG. 9 is a flowchart of another method for monitoring people at a site in accordance with the invention.

Referring now to FIG. 9, which is similar in some respects to FIG. 1 and for which the same elements will not be described, in an alternate embodiment, an additional condition or characteristic is analyzed relating to the object or person when determining whether the object or person is a new object or person for which tracking is to be begin or a previously imaged object or person for which the tracking record is to be updated.

Use of multiple characteristics improves the likelihood of different people being considered different people by the processor (and not erroneously as the same person). Indeed, with an increase in the number of characteristics of or relating to the object or person in images that are used in a comparison to the same characteristics of previously imaged objects or people, the likelihood of differentiating different people improves. Typically, use of only a single characteristic, such as color, might consider different people to be the same and therefore use of two or more characteristics is beneficial.

Each additional characteristic is, like the color characteristic, preferably derivable from one or more of the images obtained in step 12, i.e., generally through imaging, and therefore each additional characteristic may be considered an imaging characteristic. For example, the imaging characteristic may be a direction of movement or speed of movement of the person identified in an image. The manner in which a direction or speed of movement of an object or person can be derived from an image is known to those skilled in the imaging field or readily ascertainable in view of the disclosure herein.

As a preliminary matter and to improve the movement characteristic, the height of the object or person is measured to get a normalization factor for the speed. Indeed, camera calibration is not used, so the processor does not actually determine the approximate height, e.g., in centimeters, of each object or person being imaged. Rather, height is used to enable an estimate of the possible range of movement of the object or person. For example, if the processor detects someone and their image has a height of 100 pixels, this provides the processor with an indication of the potential distance (in pixels) that person can travel in another, subsequently obtained image. A general assumption may therefore be made that a person is 1.70 m tall, and knowing the time difference between one frame and another frame (in sec), the movement can be analyzed to determine whether, assuming the same person is in both images, that the maximum walking speed of a person in m/sec is reasonable. If not, the person is the subsequently obtained image is considered a new image and assigned a new tracking record. Otherwise, the tracking record for the person is updated.

When processing a sequence of images, i.e., a video from the imaging source, each moving object or person may be assigned its identification attribute based on the estimated height. The video can be stored with a mark around or associated with each moving object or person, e.g., a rectangular with a number around the object or person.

In the method depicted in FIG. 9, after the person is identified in step 16 and associated with color characteristics in step 18, the color characteristics of the person in the image being currently processed is compared to the color characteristics of people in previously processed images, in step 20. From this comparison, a determination is made whether the color characteristics of a person in the currently processed image is above the threshold of resemblance to the color characteristics of a person in another image, step 22 (e.g., within a range of +/−5%).

When the color characteristics of an identified person in one image is at or below the threshold of color resemblance to the color characteristics of any people in images previously obtained and being used for the comparison, then the processor is configured to consider the person in the image to be different than any previously identified person, step 26. The processor then creates a new identification attribute and proceeds to track this new object or person.

After the comparison of the color characteristics of a person in an image to the color characteristics of people in previously obtained images, a determination is made whether there are more images to be processed, step 28. If so, the method returns to step 12.

When the color characteristics of an identified person in one image is above the threshold of color resemblance to the color characteristics of any people in images previously obtained and being used for the comparison, the processor determines whether it is possible that same person is present in both images based on movement information, step 74. This analysis is based on location and movement of the person.

Figure 10:
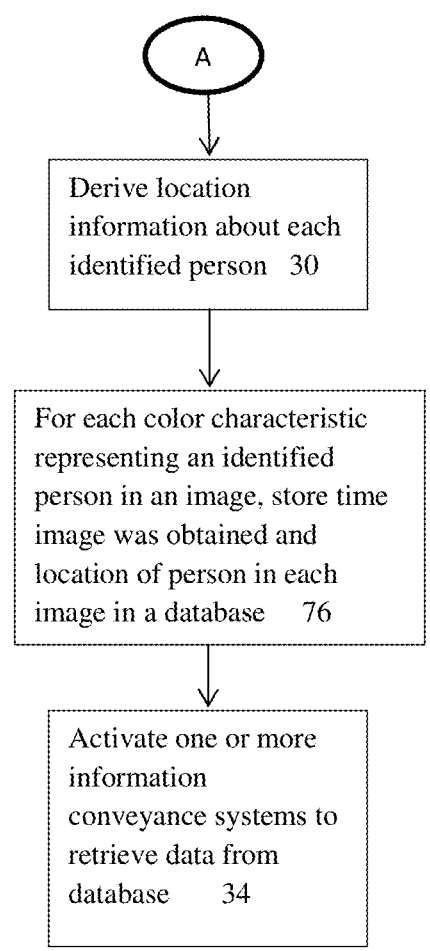
FIG. 10 is a continuation of the flowchart of the method for monitoring people at a site in accordance with the invention shown in FIG. 9.

Referring now to FIG. 10, which is a continuation of FIG. 9 and similar to FIG. 2, if there are no more images to be processed, it is then possible to use the information obtained when analyzing the color characteristics of each identified person (verified by the analysis of the location and movement information). For example, the processor is configured to derive location information in step 30. Once the location data is derived (and the location and movement information is analyzed to confirm the likelihood of the person or object being the same in multiple images), the processor creates a database for each color characteristic representing an identified person in an image, and stores the time the image was obtained and location of person in each image in the database, step 76. By continually retrieving and analyzing images, a database of identification attributes with the location of each person at different times is created and stored on computer-readable media in a manner known to those skilled in the art to which this invention pertains. An information conveyance system may be activated to retrieve data from the database to convey the time and location-related data about identified people, step 34.

As an elaboration of the step 74, additional information may be used when determining whether an object or person in one image is the same as a previously imaged object or person, such as direction of movement of the object or person and speed of movement of the object or person, or to verify that the object or person in multiple images is the same. Direction and speed are estimated, e.g., by the processor that processes the images, from analysis of multiple images. For example, by analyzing multiple, sequential images including the same person, it is possible to determine direction and speed of movement of the person. More specifically, once a person is identified in an image, the images or frames obtained immediately preceding and after this image may be analyzed to determine direction and speed of the person, as well as even determining the location to which the person is moving. A computer program that can consider the time differential and determine location of the person in each image can be configured by those skilled in the image processing field to be executed by the image processor to obtain the direction and speed of the objects or people in the images.

The direction and speed of movement of the object or person can therefore be additional movement-related information that is used to create an association between objects or people in different images and consider whether the objects or people are the same for tracking purposes, or different objects or people. This may be considered an additional layer in the database. The database would therefore include an identification attribute along with the color characteristic and any additional imaging characteristics, such as the estimated height of the person, and movement-related information such as the direction the person is moving and the speed of movement of the person.

The foregoing location and movement information analysis may be limited to being performed only when the normalization factor, e.g., height of the object or person, is within a permitted deviation. That is, even when the color resemblance is above the threshold, if the height factor changes too rapidly, this would be a good indication that the object or people are not the same. The height factor can thus be used as a filter to reduce the need to analyze location and movement information since if the height of an object in two images changes too rapidly, the object in the latter image is considered a new object without requiring the analysis of the location and movement information to determine whether the object can be the same based on the physical possibility of its moving to the different location based on its speed and direction of movement associated with the earlier image.

Referring now to FIG. 11, which is an alternate embodiment of FIG. 9, when the processor processes another image to determine whether a person in that image is the same as one previously imaged, it can compare the color characteristic to perform a preliminary analysis of whether the person in the newly acquired image is the same as the person in a previously acquired image for which there is already an identification attribute (step 74). If this threshold analysis is positive, the processor could then proceed to the subsequent analysis of movement-related information, deriving the location of the person in the newly acquired image in step 78 and retrieving the movement-related information in step 80.

In step 82, the processor determines whether it is physically possible for the person to be the same person based on the direction of movement and speed of movement of the person in the previously acquired image. For example, if it is known that the person is moving in an easterly direction at a speed of 1 meter/second and this information is associated with an identification attribute, and then the newly acquired image reveals that the person therein (having satisfied the color threshold of resemblance) is about 1 meter away toward the east from the position of the person in the previously acquired image and the newly acquired image was obtained about 1 second after the previously acquired image, then the analysis indicates with high likelihood that the person in the newly acquired image is the same person as in the previously acquired image.

Accordingly, when this secondary analysis of direction and speed reveals that the person in the newly acquired image can physically be the same person as the one in the previously acquired image, then they are consider the same person (step 84) and the tracking record for this person is updated with location information derived from the newly acquired image (step 86).

On the other hand, if it is known that the person is moving in an easterly direction at a speed of 1 meter/second and this information is associated with an identification attribute, and then the newly acquired image reveals that the person (having satisfied the color threshold of resemblance) is about 2 meter away toward the west from the position of the person in the previously acquired image and the newly acquired image was obtained about 1 second after the previously acquired image, then the analysis in step 82 indicates with high likelihood that the person in the newly acquired image is not the same person as in the previously acquired image, step 26. The deviation in both the directional displacement and achievable distance in the time differential disfavor considering the person in the newly acquired image to be the same as the person in the previously acquired image (even if the color characteristics are above the thresholds of resemblance).

Direction/speed information can therefore be stored in the database with the identification attribute for each image and are used together with the color characteristic to "track" a person over several frames. Different images of the same person are accumulated and used to create a color model that accounts for the variability in lights, pose, etc. This cumulative model is used to compare objects across different cameras (e.g., as sort of an identity search).

The technique of using movement-related information to improve the analysis of whether people or objects in different images are the same does not require preliminary analysis of color characteristics as described with respect to FIGS. 9-11. Rather, it is possible in an embodiment of the invention to use only color characteristics to perform the initial determination based on a threshold of resemblance of the color characteristic (FIGS. 1 and 2) and then proceed to the analysis of the movement-related information (without considering the estimated height or other imaging characteristic). To this end, FIG. 11 indicates that it can start with a YES response to step 22 in FIG. 1. The same aspects of the manner in which the movement-related information is used described above with respect to FIG. 11 is therefore equally applicable to the method and arrangement described with respect to FIGS. 1 and 2, which is a disclosed invention.

Another technique that may be used to analyze the images to determine whether objects or people in multiple images are the same is based on analysis of changes in pixels of the images taken out of sequence, i.e., time or temporally spaced images. That is, an image is analyzed relative to another image which is not consecutively taken and there is thus a time gap between the images. In this embodiment, the later acquired image is analyzed to determine whether there are changes to the pixels relative to those in the earlier acquired image. If no pixel changes are detected, it is not necessary to analyze the later acquired image (or the intervening images) since it will be assumed that there is no movement of an object or person into or out of the monitored area. The object or person may be stationary.

When a pixel change is detected, the color resemblance analysis may be performed. If performed and the color resemblance is at or below the threshold, the object in the later image is considered not to be the same as the object in the earlier image, and a new identification attribute is associated with the color characteristic and a new tracking record is generated.

Figure 3:
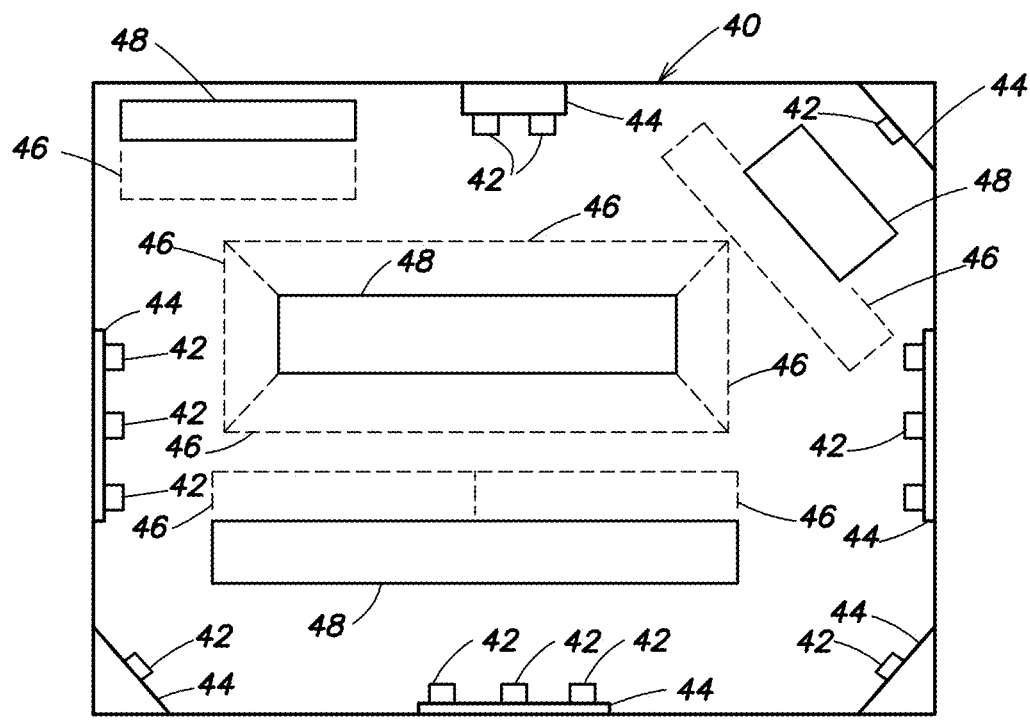
FIG. 3 is a top view of a venue, specifically, a store, incorporating an arrangement in accordance with the invention.

If the color resemblance is above the threshold, the intervening images are then analyzed to determined whether the object in the later image can be the same as the object in the earlier image, i.e., there is detected movement of the same object in the intervening images. If so, the object is considered the same. Analysis of the pixel changes therefore reduces processing requirements. However, if through analysis of location and time information about the object in the intervening images indicates that the object cannot be the same, e.g. the movement is in excess of an assumed speed of movement of person, then the objects are not considered the same. As in the embodiment above, the assumed speed of movement may be based on an image-derived characteristic of the object or person, e.g., an estimated height of the person, FIG. 3 shows an exemplifying venue or site designated 40 in which the method and arrangement in accordance with the invention may be applied to analyze the behavior of people, and specifically their movement and flow through the site 40 in real time and over time. The site 40 may be a store, house, office, trade show booth, restaurant, and the like. At the site 40, color imaging devices such as medium or high-resolution color cameras 42 are mounted on support structure 44 in fixed locations. Each camera 42 functions to provide images of its field of view, namely, a portion of the site 40. As a practical matter, when coordinating the field of view of the cameras 42 to the site 40, it should be ensured that adequate lighting is available to obtain clear images.

Site 40 is preferably virtually segmented into a plurality of defined areas 46, each defined area constituting a location about which the presence of people in it and flow of people through it is desired to be quantified. The cameras 42 are positioned on the support structure 44 of the site 40 so that each defined area 46 is imaged by at least one of the cameras 42. Placement of the cameras 42 on the support structure 44 and relative to the defined areas 46 may be varied depending on the various factors, such as, which location provides the best image of people occupying the defined area 46, i.e., images with the least amount of obstruction or overlap with other defined areas.

The defined areas 46 are preferably formed relative to fixtures 48 at the site 40. As used herein, a fixture will generally mean an object whose position does not change over the time the monitoring technique is being applied. These objects may be movable, but for the analysis purposes of the invention, they will be considered to be fixed in position during the imaging.

Figure 4:
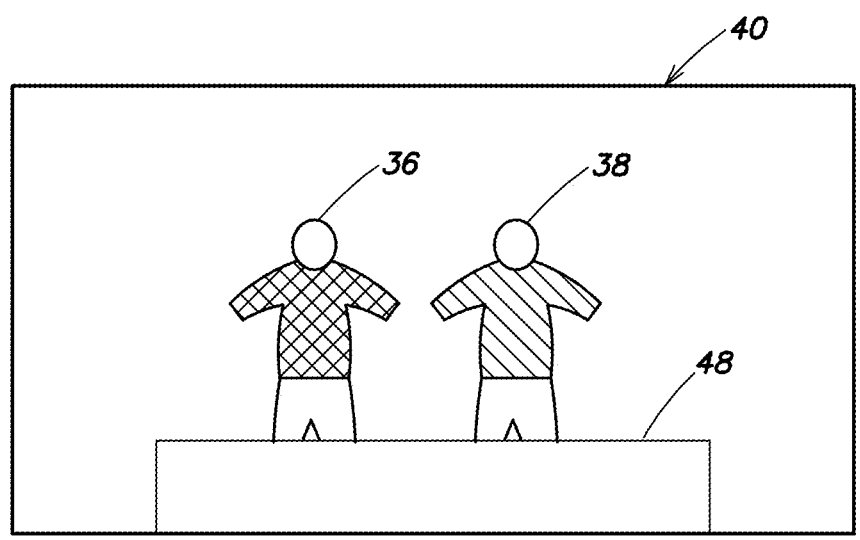
FIG. 4 is an image obtained using a camera assembly in accordance with the invention.

FIG. 4 shows an image from one of the cameras 42 that includes a fixture 48, and data about people in images from this camera 48, such as shown in FIG. 4, may be used to assess how many people were interested in the contents of the fixture 48 or the fixture itself. The displayed image would be processed to identify two different people 36, 38 in the defined area 46 adjacent a fixture 48. The people 36, 38 have different color characteristics in view of their different pattern shirts.

Since an objective of the invention is to provide data about the presence of people in defined areas 42, by forming the defined areas adjacent to specific fixtures 48, it becomes possible to obtain, by analyzing images from the cameras 42 encompassing each defined area 46, data about how many people enter into a defined area 46 adjacent a fixture 48 and remain in that defined area for a set period of time, e.g., 15 seconds. In this manner, this number of people may be used to assess potential interest of people in purchasing objects displayed in the fixture 48. Additionally, if the fixtures 48 are saleable merchandise, e.g., furniture, then it becomes possible to obtain data about the interest people have in purchasing the furniture.

If the site 40 is a store, an owner of the store 40 may obtain a graphical representation of the number of people waiting to pay if one of the defined areas 46 is a designated corridor leading to a cashier, the number of people waiting for service if one of the defined areas 46 is a manned counter, and/or the number of people lingering in front of a store fixture 48 containing specific objects.

In the latter case, if the objects are subject to a promotion, the store owner could obtain a graphical representation indicative of the effectiveness of the promotion. If the display derived from the monitoring data indicates that a relatively large number of people were present in the defined area 46 in front of the fixture 48 containing promotion objects, then the store owner would recognize that the promotion was a success. Conversely, if the display derived from the monitoring data indicates that a relatively small number of people were present in the defined area 46 in front of the fixture 48 containing promotion objects, then the store owner would recognize that the promotion was a failure. The store owner could also compare different promotions by providing a defined area in front of two or more fixtures 48, each containing a different promotion object or the same object with different promotional features, and then view the display derived from the monitoring data and visually determine which promotion was the best. Thus, the invention also covers a method for analyzing promotions, and transforming image data into promotion effectiveness data that is displayed on a display.

It is imperative to appreciate that there are virtually no limitations on the manner in which the data derived by monitoring methods and arrangements in accordance with the invention may be used, and a graphical or tabular representation are only examples. Additional uses of the data by information conveyance systems include configuring of the processor to analyze the data relative to user-provided alarm generating conditions. An alarm generating condition may be an excess of people at one location, e.g., 1000 people in a space designed for 300. The processor can be connected to an audio and/or visual warning generator, which would generate an audio message about overcrowding at the location or convey a visual warning about the overcrowding. A speakerphone or display at the remote terminal would thus provide notification of the overcrowding when the processor monitors in real-time the location and determines it is overcrowded.

Another use of the data is to configure the processor to interface with a communications network and cause communications to be directed via a communications system to personnel to respond or react to activity at the site. Security personnel may be notified by their smartphones, pagers or other handheld communication devices about the situation at a monitored site and directed to respond when a condition exist that requires their attention. The processor is configured by the user to generate such communications when it determines the presence of a communication-necessitating condition. Such programming of the processor to respond to situations involving people at the monitored site, whether by causing a visual or audio warning or communication, is within the purview of those skilled in the art in view of the disclosure herein.

The examples provided above, i.e., of using the number of people that enter into and remain in a defined area 46 relative to a fixture 48 for the purpose of quantifying promotion effectiveness or potential interest in purchasing objects displayed in the fixture 48, or in purchasing the fixture 48 if for sale, are not intended to limit the invention in any manner. Rather, the invention generally seeks to quantify the presence of people in the defined areas 46 as well as, by tracking movement of the people, quantify the movement of the people relative to the defined areas.

Instead of forming the defined areas 46 adjacent to fixtures 48, it is possible to form the defined areas 46 as the fixtures 48 and then analyze the images to derive data about the number of people proximate the defined areas 46. In this case, proximate would mean within a set distance from the defined area 46 to enable a person to view objects in the defined area 46. Thus, for a furniture store, the defined area 46 may be each piece of furniture and the images from the cameras 42 analyzed to determine whether a person is within, say, 10 feet of the furniture.

The interpretation of proximate therefore depends on the content of the defined areas 46. If the defined areas 46 were to be, for example, cars at a car show, then the images from the cameras 42 might be analyzed to determine whether a person is within 25 feet of the car. On the other hand, if the defined areas 46 were display cases of jewelry, then the images from the cameras 42 might be analyzed to determine whether a person is within 1 feet of the display case. One skilled in the art would be able to quantify the term proximate relative to the content of the defined areas 46 in view of the examples provided above and the disclosure herein. Interpretation of proximate may also depend on other factors, such as the dimensions and shape of the defined areas 46.

Figure 5:
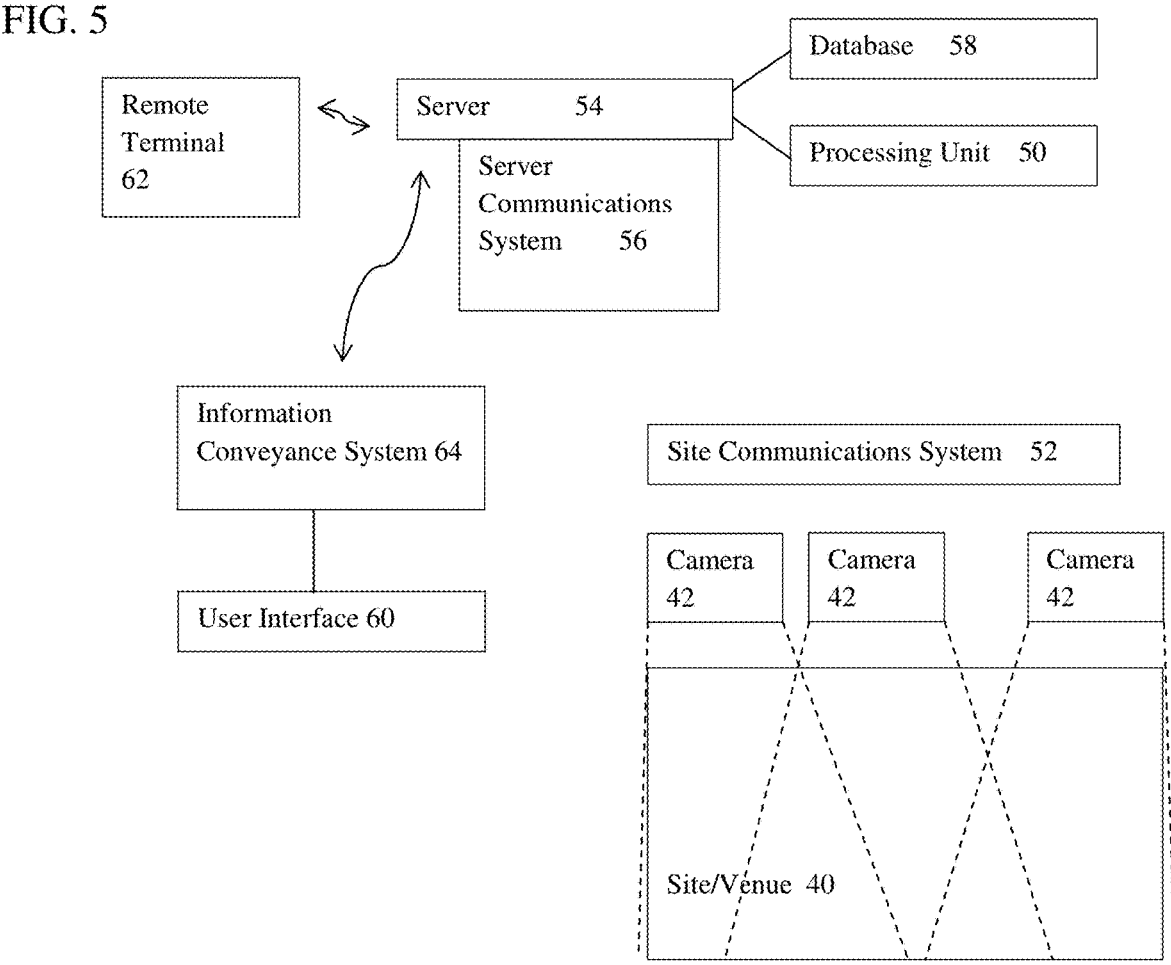
FIG. 5 shows an arrangement for quantifying people relative to fixed objects at a site in accordance with the invention.

As shown in FIG. 5, cameras 42 are coupled to a processing unit 50, which may also be considered as, included in or part of a server as this term is understood by those skilled in the art of tracking objects. Processing unit 50 may be situated at a remote location from the site 40. Images from the cameras 42 are sent to the processing unit 50 for analysis. Communication between the cameras 42 and the remote situated processing unit 50 may utilize the Internet or any other network or communications capability. To enable such communications, the cameras 42 are coupled to a common communications unit 52, or each to a respective communications unit, and this communications unit 52 includes the necessary hardware and software to convey the images from the cameras 42 to the processing unit 50. Instead of conveying the images from the cameras 42 to the processing unit 50, the images from the cameras 42 may be processed as disclosed below, or pre-processed, e.g., compressed, and the results of the processing conveyed by the communications unit 52 to the processing unit 50.

Analysis of the images from the cameras 42 by the processing unit 50 is performed using a combination of hardware and software. The hardware components of the processing unit 50 are those that are necessary to enable images to be analyzed and data output, including but not limited to, a processor, memory components for storing temporarily or permanently storing data, ports for allowing for data inflow and outflow and computer readable media, while the software components including a computer program that can be stored on the computer-readable media and executed by the processor to cause actions to be formed in images and data. Such processing units are known to those skilled in the art to which this invention pertains and the software to implement the analysis techniques in accordance with the invention can be created by software programmers in light of the disclosure herein.

Another use of the monitoring technique of the invention is for medical facilities such as a hospital. A hospital can provide its staff with wearable devices that track their whereabouts, and might be configured to provide a warning. If the method is operative to track the hospital staff relative to designated areas, such as patient care rooms, operating rooms, nurse stations, etc., then a database would be generated with location and time data about the hospital staff relative to such designated areas. In the event an infection breaks out, this database can be accessed to facilitate identifying all those who came in contact with the source of the infection. A processor would therefore be directed by a user to determine which people were present at the location of the infection source, e.g., location B of the table above, and the people associated with identification attributes 0020-0023 would be identified as potentially infected. The processor would activate an information conveyance system, e.g., a warning functionality on a dedicated wearable device or a warning or message functionality on a communications device, to notify the people associated with identification attributes 0020-0023 about their potential infection. In this embodiment, the database would also be provided with a link between the identification attributes and a manner to contact the people from which the identification attributes have been generated.

Additional uses include shopping malls that can obtain people counts per sector, at different times per day, week and month, and security systems may follow a suspicious individual's whereabouts across an entire venue. Hospitality systems may track VIP customers' whereabouts to cater to their needs, such as delivering snacks at pool side.

FIG. 5 also shows an arrangement for quantifying people relative to fixed objects at a site, and enabling action to be taken in response to the number of people at the site or in specific portions of the site. This arrangement includes cameras 42 monitoring a site 40 like in FIG. 3, and also includes the site communications unit 52. A server 54 coordinates the arrangement and includes a server communications system 56 to communicate with the site communications unit 52. Communication between the server communications system 56 and the site communications unit 52 will typically involve a wireless connection, such as but not limited to a Wi-Fi connection. As a practical matter, during installation of the arrangement, it should be ensured that the video feed from all of the cameras reach the server 54.

The server 54 is also coupled to the processing unit 50, as well as a database 58 that stores the time and location-related data about the identified objects. Database 58 is accessible by the processing unit 50 executing a program to access and retrieve specific data contained in the database, or to add to the data in the database. The database 58 includes memory media on which the time and location-related data is stored. Database 58 may be a multi-component database, and its depiction as a single component is not intended to limit the invention to use of a single database. Rather, the invention encompasses multiple databases, and possible database at different locations.

In operation, the cameras 42 obtain images including fixtures 48 and any people proximate the fixtures 48, i.e. in the defined areas 46 proximate the fixtures 48. The site communications unit 52 is coupled to the cameras 42 forwards images obtained by the cameras 42. The server communications system 56 receives images from the site communications unit 52. The processing unit 50 analyzes received images and identifies people in the images and associates color characteristics with each identified person. The processing unit 50 also performs the comparison of each image currently being processed to previously processed images vis-à-vis the threshold of color resemblance so that when the color characteristics of a person in one image is above a threshold of color resemblance to the color characteristics of a person in another image, the person in both images is considered to be the same, and on the other hand, when the color characteristics of a person in one image is at or below a threshold of color resemblance to the color characteristics of a person in another image, the person in both images is considered to be different (and a new identification attribute for this identified person is generated).

The processing unit 50 derives data about time that each image including an identified person was obtained and location of each person when each image including an identified person was obtained. This location may be relative to the defined areas 46, i.e., the defined area 46 in which the identified person is present at each time.

Server 54 is also coupled to an information conveyance system 64 to convey the time and location-related data about identified people relative to the fixed objects at the site 40. Server 54 may also be coupled to a remote terminal 62 that can be used to control and obtain output from the server 54. A user interface 60 is coupled to the information conveyance system 64 to enable a user to selectively access data from database 58 and cause such data to be output to the information conveyance system 64. The user is thus able to retrieve whatever time and location-related data they want to view on a display of the information conveyance system 64 from the database 58 through the server 54.

Figure 6:
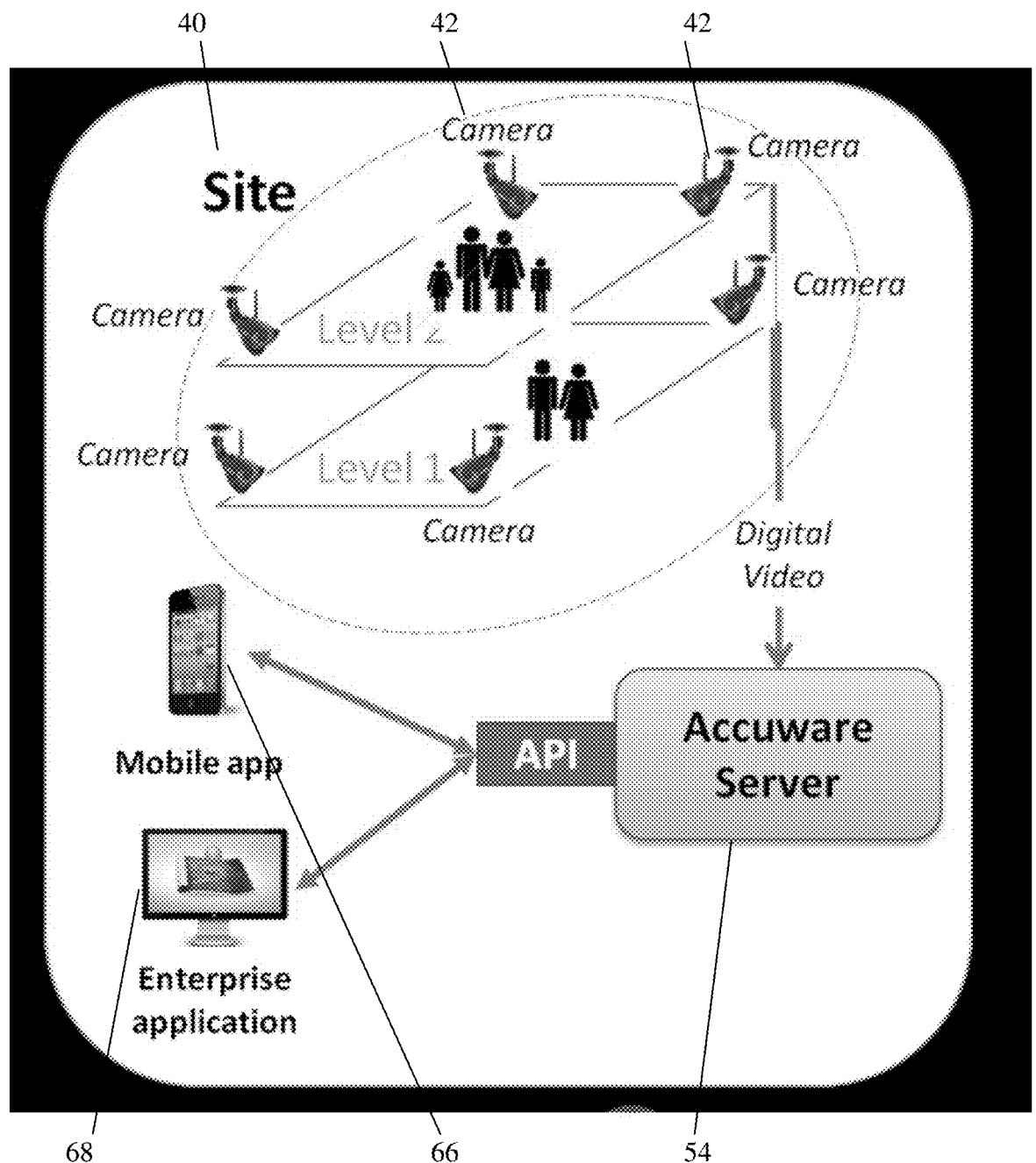
FIG. 6 shows another implementation of the invention using a server.

FIG. 6 shows another implementation of the invention using a server 54. In this embodiment, individuals move through a site within range of a video camera 42, and video feed from cameras 42 that capture the movement is converted to a digital video stream and uploaded to the server 54. The server 54 analyzes the video stream, detects individuals and estimates their locations in the site over time (using a technique disclosed herein). Applications, subject to authorization and security, are executed by the smartphone 66 or desktop computer 68 and query the server 54 to obtain data about the image processing by the server 54, e.g., individuals' locations in real time and over time, which data is displayed on displays of the smartphone 66 and/or monitor associated with a desktop computer 68.

The foregoing description evidences conception and reduction to practice of a video tracker that serves as a real-time locating system (RTLS) designed for tracking people's movement in areas covered by video cameras. The invention provides location of people moving through monitored venues (relative to defined areas of the venue) and enables tagging individuals to follow their movement across a site. The individuals are tagged by deriving a color characteristic of the individual from an initial image including the individual (by means of a processor) and then determining the location of the same individual in other images from the site, also by the processor. This latter determination is, as disclosed above, based on a determination of the same individual being present in the other images as a result of the color characteristic of the individual in the other images being above the color resemblance threshold relative to the color characteristic of the individual in the initial image.

The invention also provides a processing unit that is capable of people counting in real time and over time, e.g., by determining how many different color characteristics are present in an image, with each representing a distinct individual. The processor can also generate a daily log of people tracked, and output this daily log in graphical form. The frequency of location determination may be every second, i.e., the person's movement is tracked every second by analyzing images including that person obtained every second. Alternatively, the individual can be tracked as long as they remain in the field of view of a single camera. Different tracking frequencies can be used in the invention in combination with one another.

An advantage of the invention is the fact that mobile devices or apps are not required. Rather, an implementation can be established using video cameras deployed at the monitoring site and a processor or server that analyzes the video data, and some device to convey the processed data. It is thus possible to manage the monitoring and tracking technique by interfacing with the processor, which may be achieved using a dashboard with control capabilities. An API is also provided for integration, along with the dashboard for site management.

In an installation, the first step is to ensure that the number of cameras 42 and their placement provides the desired coverage for the venue or site 40. It is also necessary to ensure that all cameras' feeds reach the server 54 as a digitized video stream. The person interested in receiving information about the site 40 then signs into a dashboard provided by the server 54 and define the various levels of the site 40, e.g., the defined areas. It is possible to upload floor plans for every level and geo-locate them, and then mark each camera's placement on the corresponding floor plan.

The system can be trained to geo-locate the area covered by each camera 42. This may entail, the user accessing the dashboard and viewing the corresponding floor plan for each defined area of the site 40. The user can visualize each camera's coverage, and mark reference point on the floor plan by viewing the display of the floor plan. Location accuracy can be verified.

To the extent necessary to qualify the invention as patent-eligible subject matter, the methods in accordance with the invention disclosed above may be considered an improvement to monitoring and tracking methods, i.e., "improvements to another technology or technical field". While numerous methods and arrangements are known to monitor the movement of people and enable them to be tracked over time, the present invention improves known prior art monitoring and tracking methods by improving the likelihood that when processing data about objects in multiple images, the same objects are not separately analyzed. Otherwise, if movement of an object in multiple images is tracked and erroneously considered to be the same object, then the movement data is faulty and of limited value. Similarly, if the movement of several objects in multiple images is tracked individually, but the objects are really only a single object, then the movement data is faulty and of limited value.

Specifically, the invention improves the likelihood that an object, such as a person, in multiple images is the same person by involving a color characteristic analysis to aid in the determination of whether an identified person is the same as or different from a previously identified person. This determination is based on a parameter disclosed herein, the threshold of color resemblance. This threshold represents a measure of similarity between color characteristics of a person identified in one image relative to the color characteristics of a person identified in different images, with the color characteristics being determined in the same manner for the images. When the measure is above the threshold (e.g., there are minor or nominal differences between the color characteristics), the identified people are considered the same by associating them with a common identifier or identification attribute, and data about the time and location of the identified person in the multiple images is used to track the movement of the person. When the measure is at or below the threshold (e.g., there are not minor or nominal differences between the color characteristics, but rather significant differences), the data about the identified person in each of the images is not associated with a common identifier or identification attribute and the identified people are not considered the same because their measure of similarity is at or below the threshold.

The terms "memory media", "memory medium" and "memory component" are intended to include an installation medium, e.g., Compact Disc Read Only Memories (CD-ROMs), a computer system memory such as Dynamic Random Access Memory (DRAM), Static Random Access Memory (SRAM), Extended Data Out Random Access Memory (EDO RAM), Double Data Rate Random Access Memory (DDR RAM), Rambus Random Access Memory (RAM), etc., or a non-volatile memory such as a magnetic media, e.g., a hard drive or optical storage. The memory medium may also include other types of memory or combinations thereof. In addition, the memory medium may be located in two different, spatially separated computers, one of which executes the programs while connected to the other computer over a network to receive program instructions therefrom for execution.

The processing unit 50 may take various forms such as a personal computer system, mainframe computer system, workstation, network appliance, Internet appliance, personal digital assistant ("PDA"), television system or other device. In general, the term "processing unit" may refer to any device having a processor that executes instructions from a memory medium.

The memory media or component may store a software program or programs operable to implement a method for analyzing venue visitors' behavior by following the movements of people inside the venues, identifying and tracking them by their visual signature, for people counting for venues such as museums and shopping malls over specific time periods, enabling security personnel to attach a name or unique identification to any specific person seen by a camera and follow their movements automatically on a floor plan, and tracking VIP customers' whereabouts for certain hospitality venues, such as hotels or casinos, to thereby enable personalized assistance, such as delivering an order at the right table as the client moves around. The memory media may also store a software program or programs operable to implement a method for locating people moving through monitored venues, counting people in real-time and over time, and providing a daily or other periodic log of people being tracked, all without requiring a mobile device or "app". The memory media may also store a software program or programs operable to implement a method for generating a user-configured dashboard for managing a website that generates representations of the foregoing results of data processing about the location of people in a venue.

The software program(s) may be implemented in various ways, including, but not limited to, procedure-based techniques, component-based techniques, and/or object-oriented techniques, among others. For example, the software programs may be implemented using ActiveX controls, C++ objects, JavaBeans, Microsoft Foundation Classes (MFC), browser-based applications (e.g., Java applets), traditional programs, or other technologies or methodologies, as desired. Processing unit 50 may thus include a central processing unit (CPU) for executing code and data from the memory medium and may include a means for creating and executing the software program or programs according to the embodiments described herein.

Various embodiments may also include receiving or storing instructions and/or data implemented in accordance with the foregoing description upon a carrier medium. Suitable carrier media may include storage media or memory media such as magnetic or optical media, e.g., disk or CD-ROM.

While particular embodiments of the invention have been shown and described, it will be obvious to those skilled in the art that changes and modifications may be made without departing from the invention in its broader aspects, and, therefore, the aim in the appended claims is to cover all such changes and modifications as fall within the true spirit and scope of the invention.

The invention claimed is:

1. A method for monitoring objects or people at a site and using information obtained from the monitoring, comprising:
   analyzing, using a processor, images of the site obtained at different times to determine whether an object or person is present in each image;
   for each object or person determined to be present in each current image,
      deriving, using the processor, data about time that the current image was obtained and location-related data about the object or person when the current image was obtained,
      associating a color characteristic with the object or person in the current image;
      determining a degree of similarity between the color characteristic associated with the object or person determined to be present in the current image and a color characteristic associated with an object or person determined to be present in a previously analyzed image, the color characteristic associated with the object or person determined to be present in the previously analyzed image having an assigned unique identification attribute and a generated tracking record for this assigned identification attribute including time and location-related data about the object or person determined to be present in the previously analyzed image;
      determining that one of the following is present:
      1) the degree of similarity is above a threshold and it is possible that the same object or person is present in both the current image and the previously analyzed image based on information about when the current image and the previously analyzed image were obtained and location of the object or person in the current image and the previously analyzed image; and
      2) the degree of similarity is above the threshold and it is not possible that the same object or person is present in both the current image and the previously analyzed image and thus likely indicative of the object or person in the current image being a new object or person not previously imaged at the site; and
      3) the degree of similarity is not above the threshold and thus likely indicative of the object or person in the current image being a new object or person not previously imaged at the site; and
      when it is determined that the degree of similarity is above the threshold and it is possible that the same object or person is present in both the current image and the previously analyzed image, including in the tracking record for the identification attribute assigned to the color characteristic associated with the object or person determined to be present in the previously analyzed image, the time and location-related data about the object or person determined to be present in the current image such that the tracking record for the identification attribute assigned to the color characteristic associated with the object or person determined to be present in the previously analyzed image includes the location-related data at different times to enable a path of the object or person to be generated;

when it is determined that the degree of similarity is above the threshold and it is not possible that the same object or person is present in both the current image and the previously analyzed image, assigning a new, unique identification attribute to the color characteristic associated with the object or person determined to be present in the current image, and generating a new tracking record for the new identification attribute assigned to the color characteristic associated with the object or person determined to be present in the current image including time and location-related data about the object or person determined to be present in the current image; and when it is determined that the degree of similarity is not above the threshold, assigning a new, unique identification attribute to the color characteristic associated with the object or person determined to be present in the current image, and generating a new tracking record for the new identification attribute assigned to the color characteristic associated with the object or person determined to be present in the current image including time and location-related data about the object or person determined to be present in the current image; and activating an information conveyance system to convey the generated tracking records about objects or people.

2. The method of claim 1, wherein determining that it is possible that the same object or person is present in both the current image and the previously analyzed image comprises:

determining location of the object or person determined to be present in the current image; and determining whether it is possible for the object or person determined to be present in the current image to be the same as the object or person determined to be present in the previously analyzed image based on differences in time and location between the object or person determined to be present in the current image and the object or person determined to be present in the previously analyzed image, and movement-related information about the object or person determined to be present in the previously analyzed image.

3. The method of claim 2, further comprising:

storing in a database, identification attributes with the associated color characteristics and the movement-related information; and retrieving from the database, the movement-related information of the identification attribute assigned to the color characteristic associated with the object or person determined to be present in the previously analyzed image when determining whether it is possible for the object or person determined to be present in the current image to be the same as the object or person determined to be present in the previously analyzed image.

4. The method of claim 2, wherein the movement-related information includes an estimate of speed of movement of the object or person derived from an estimation of height of the object or person.

5. The method of claim 1, wherein the step of activating the information conveyance system to convey the generated tracking records about objects or people comprises activating the information conveyance system to convey the generated tracking records in real time or the location-related data about one or more identified objects or people relative to defined areas of the site or movement of the identified objects or people into, between or out of the defined areas of the site.

6. The method of claim 1, wherein the step of associating a color characteristic with the object or person comprises:

generating a histogram of colors of visible parts of the object or person to be associated with the object or person; or generating at least one geometric form representative of a dominant visible color of the object or person to be associated with the object or person; or generating a plurality of two-dimensional geometric forms each representative of a dominant visible color of a discrete portion of the object or person to be associated with the object or person.

7. The method of claim 1, wherein the information conveyance system comprises a display, further comprising accessing the time and location-related data using a user interface to enable visualization on the display of the time and location-related data.

8. The method of claim 1, wherein the information conveyance system comprises a display, further comprising:

generating a map containing defined areas of the site and an indication of the presence of the objects or people in or proximate to each of the defined areas or an indication of the movement of the objects or people relative to the defined areas; and displaying the map on the display.

9. The method of claim 1, wherein the information conveyance system comprises a warning generating system, the warning generating system being activated to convey a warning communication resulting from the time and location-related data satisfying one or more conditions.

10. An arrangement for monitoring objects or people at a site and using information obtained from the monitoring, comprising:

a processor configured to receive images of the site obtained at different times to determine whether an object or person is present in each image, said processor being further configured to:

for each object or person determined to be present in each image, derive data about time that the current image was obtained and location-related data about the object or person when the current image was obtained, associate a color characteristic with the object or person in the current image;

determine a degree of similarity between the color characteristic associated with the object or person determined to be present in the current image and a color characteristic associated with an object or person determined to be present in a previously analyzed image, the color characteristic associated with the object or person determined to be present in the previously analyzed image having an assigned unique identification attribute and a generated tracking record for this assigned identification attribute including time and location-related data about the object or person determined to be present in the previously analyzed image;

determine, only when it is determined that the degree of similarity is above a threshold, whether it is possible that the same object or person can be present in both the current image and the previously analyzed image based on information about when the current image and the previously analyzed image were obtained and location of the object or person in the current image and the previously analyzed image;

include in the tracking record for the identification attribute assigned to the color characteristic associated with the object or person determined to be present in the previously analyzed image, only when it is determined that it is possible that the same object or person can be present in both the current image and the previously analyzed image, the time and location-related data about the object or person determined to be present in the current image such that the tracking record for the identification attribute assigned to the color characteristic associated with the object or person determined to be present in the previously analyzed image includes the location-related data at different times to enable a path of the object or person to be generated; and assign, when it is determined that the degree of similarity is not above a threshold and thus likely indicative of the object or person in the current image being a new object or person not previously imaged at the site and when it is determined that the degree of similarity is above a threshold and it is not possible that the same object or person can be present in both the current image and the previously analyzed image and thus likely indicative of the object or person in the current image being a new object or person not previously imaged at the site, a new, unique identification attribute to the color characteristic associated with the object or person determined to be present in the current image, and generate a new tracking record for the new identification attribute assigned to the color characteristic associated with the object or person determined to be present in the current image including time and location-related data about the object or person determined to be present in the current image; and an information conveyance system coupled to said processor and configured to convey the generated tracking records about objects or people.

11. The arrangement of claim 10, wherein said processor determines whether it is possible that the same object or person can be present in both the current image and the previously analyzed image by:

determining location of the object or person determined to be present in the current image; and determining whether it is possible for the object or person determined to be present in the current image to be the same as the object or person determined to be present in the previously analyzed image based on differences in time and location between the object or person determined to be present in the current image and the object or person determined to be present in the previously analyzed image, and movement-related information about the object or person determined to be present in the previously analyzed image.

12. The arrangement of claim 11, further comprising a database that stores identification attributes with the associated color characteristics and the movement-related information, said processor retrieving from the database, the movement-related information of the identification attribute assigned to the color characteristic associated with the object or person determined to be present in the previously analyzed image when determining whether it is possible for the object or person determined to be present in the current image to be the same as the object or person determined to be present in the previously analyzed image.

13. The arrangement of claim 11, wherein the movement-related information includes an estimate of speed of movement of the object or person derived from an estimation of height of the object or person.

14. The arrangement of claim 10, further comprising a user interface configured to access said information conveyance system and receive input about which of the tracking records is to be conveyed by said information conveyance system.

15. The arrangement of claim 10, wherein said information conveyance system comprises a display.

16. The arrangement of claim 10, wherein said information conveyance system comprises a warning system, said processor being configured to direct a communication to said warning system to cause said warning system to provide a visual or audio warning resulting from the time and location-related data satisfying one or more conditions.

17. An arrangement for monitoring objects or people at a site and using information obtained from the monitoring, comprising:

a processor that receives images of the site obtained at different times to determine whether an object or person is present in each image, said processor being configured to:

determine whether there is a change between two temporally spaced images; and when there is determined to be a change between the two temporally spaced images, associate a color characteristic with the object or person in each of the two images;

assign a unique identification attribute to each of the associated color characteristics;

generate a tracking record for each of the identification attributes including the time and location-related data about the object or person determined to be present in the respective one of the two images;

determine a degree of similarity between the color characteristics associated with the object or person in each of the two images;

determine, only when it is determined that the degree of similarity is above a threshold, whether it is possible that the same object or person is present in both of the two images by analyzing images obtained between the two images to identify movement and determine whether the object or person in an earlier one of the two images could have moved to the location of the object or person in a later one of the two images based on speed of the object or person;

include in the tracking record for the identification attribute assigned to the color characteristic associated with the object or person determined to be present in the earlier one of the two images, only when it is determined that it is possible that the same object or person is present in both of the two images, the time and location-related data about the object or person determined to be present in the later one of the two images such that the tracking record for the identification attribute assigned to the color characteristic associated with the object or person determined to be present in the earlier one of the two images includes the location-related data at different times to enable a path of the object or person to be generated; and an information conveyance system coupled to said processor and configured to convey the generated tracking records about objects or people.

18. The arrangement of claim 17, wherein said processor determines whether it is possible that the same object or person is present in both of the two images by determining location of the object or person determined to be present in the later one of the two images; and determining whether it is possible for the object or person determined to be present in the later one of the two images to be the same as the object or person determined to be present in the earlier one of the two images based on differences in time and location between the object or person determined to be present in the later one of the two images and the object or person determined to be present in the earlier one of the two images, and movement-related information about the object or person determined to be present in the earlier one of the two images.

19. The arrangement of claim 18, further comprising a database that stores identification attributes with the associated color characteristics and the movement-related information, said processor retrieving from the database, the movement-related information of the identification attribute assigned to the color characteristic associated with the object or person determined to be present in the earlier one of the two images when determining whether it is possible for the object or person determined to be present in the later one of the two images to be the same as the object or person determined to be present in the earlier one of the two images.

20. The arrangement of claim 18, wherein the movement-related information includes an estimate of speed of movement of the object or person derived from an estimation of height of the object or person.

* * * * *